(No Model.)
J. M. SUTTON.
CULTIVATOR.
No. 352,958. Patented Nov. 23, 1886.
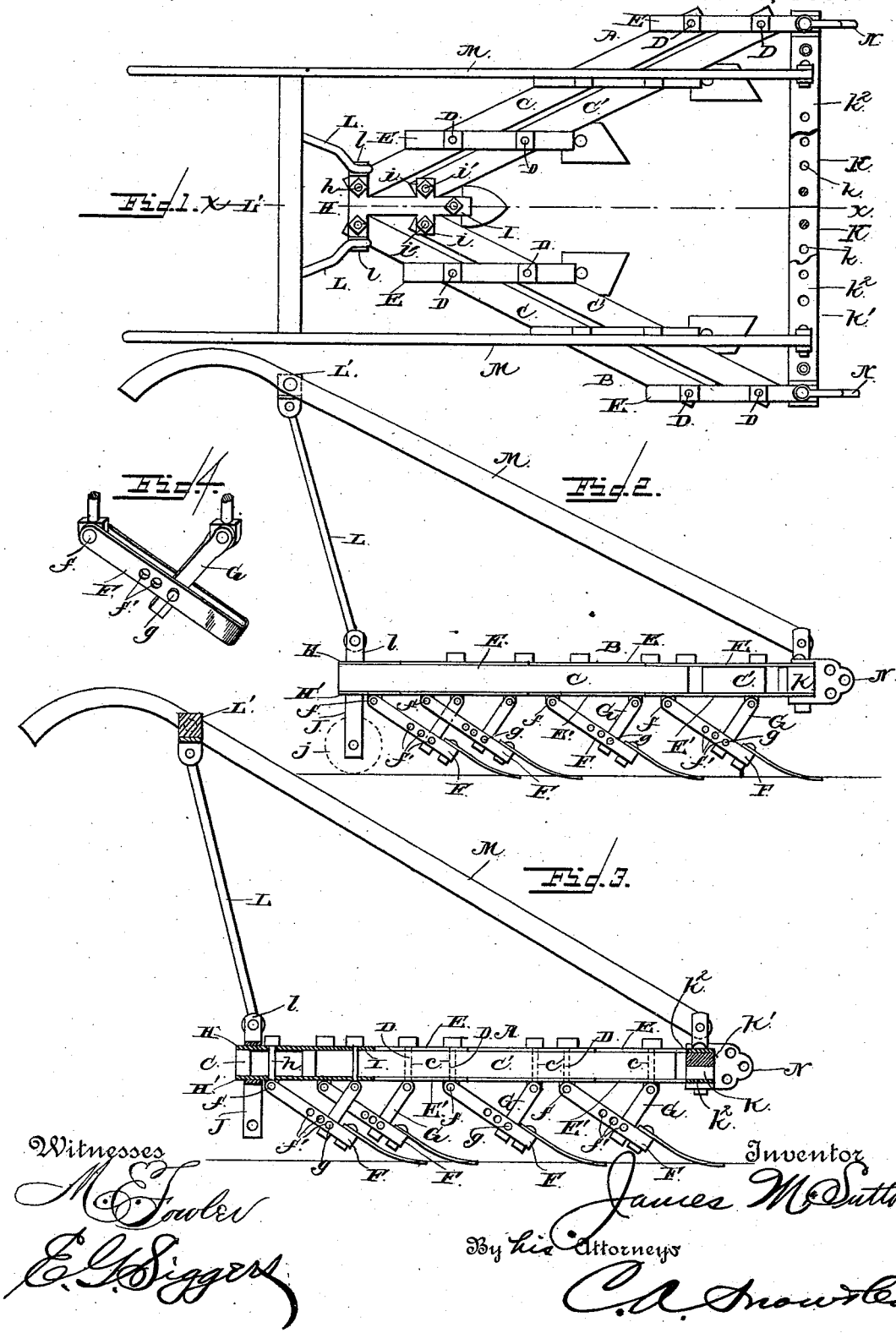

UNITED STATES PATENT OFFICE.

JAMES MACAULAY SUTTON, OF BRYAN, TEXAS.

CULTIVATOR.

SPECIFICATION forming part of Letters Patent No. 352,958, dated November 23, 1886.

Application filed August 25, 1886. Serial No. 211,833. (No model.)

*To all whom it may concern:*

Be it known that I, JAMES MACAULAY SUTTON, a citizen of the United States, residing at Bryan, in the county of Brazos and State of Texas, have invented new and useful Improvements in Cultivators, of which the following is a specification.

My invention relates to improvements in cultivators; and it consists of the peculiar combination and novel construction and arrangement of the parts for service, substantially as hereinafter fully set forth, and particularly pointed out in the claims.

The object of my invention is to provide an improved cultivator which can be very quickly and easily adjusted to adapt the device for marking out or laying off the rows of hills; to provide improved means whereby the shovels or blades are caused to always occupy the same relative position to each other, and adjust themselves when the beams of the harrow or cultivator are adjusted, and, finally, to provide improved means for adjusting the shovels at any desired angle, so that they can enter or penetrate the soil to different depths, all as presently described.

In the accompanying drawings, Figure 1 is a top plan view of my improved cultivator. Fig. 2 is a side elevation thereof, showing a roller for supporting the rear end of the cultivator, in dotted lines, when the device is adapted for laying off the rows. Fig. 3 is a longitudinal sectional view on the line $x\,x$ of Fig. 1. Fig. 4 is a detached perspective view of one of the supports or carriers for shovel or tooth.

Referring to the drawings, in which like letters of reference denote corresponding parts in all the figures, A B designate the sections of the cultivator embodying my invention, which are arranged at an angle to each other, so that they form a V, as shown in Fig. 1 of the drawings. Each section of the cultivator consists of two beams, C C', which are arranged parallel with each other at all times, and adapted to be adjusted laterally of each other, in order to vary the angle of the cultivator teeth or shovel to the line of draft of the implement. These parallel beams are provided with vertical openings $c$, through which are passed through-bolts D, and these bolts also pass through the extremities of connecting-plates E E', which are arranged diagonally across the parallel beams of the cultivator-sections, as shown. These connecting plates or links are arranged in pairs, one on the upper side of the beams of the cultivator-sections and the other on the lower side of the said beams, and each section of the cultivator is provided with a number or series of these connecting-links, which are all arranged in the same direction and angle thereto. The ends of the links or plates of each pair are connected by a pivot-bolt, D, which passes through one of the beams of the cultivator-sections, and when the said sections are adjusted the ends of the links move or turn on their bolts with the beam of the section to which they are connected, as will be very readily understood. Thus the links of the pairs are all adjusted simultaneously with the movement of the beams laterally of each other, and the beams of one cultivator-section are thereby arranged parallel with each other at all times.

F designates the shovel-carrying arm or standard, which is arranged in an inclined position or line across and beneath the horizontal beams of the cultivator-sections, and the upper end of each arm or standard F is pivotally connected to the rear end of the lower plate or link, E', of each pair, as at $f$, while the lower end of the said shovel-standard is provided with a series of three or more apertures, $f'$, through one of which passes a pin or bolt, $g$, which serves to detachably and adjustably connect the lower end of an inclined supporting-arm, G, to the shovel-standard, and thereby adapt the said shovel-standard to be adjusted at different angles or degrees to the ground, in order to cause the shovel or tooth $f^2$, carried by the lower end thereof, to enter the ground at different depths, as is obvious.

It will be seen that the shovel-standard and the arm or link for adjusting the same are carried by the lower link or section, E', of each pair, and are adjusted simultaneously therewith; and when the said link or plate E' is adjusted by the lateral movement of the cultivator-section beams the said standard and its arm are adjusted with the plate, and thereby vary the angle or inclination of the shovel to the line of draft of the cultivator.

The rear ends of the outer beams, C, of each section A B of the cultivator are connected by means of plates H H', which are arranged on the upper and lower sides of the said beams, and are secured thereto by vertical through-bolts h, and these plates are provided with outwardly-extending arms I, which are formed integral therewith, and carry lugs i at their forward ends, which bear upon the upper and lower sides of the rear meeting ends of the inner beams, C', of the cultivator-sections, and are secured thereto in like manner as the plates H H' are secured to the rear ends of the outer beams, C, of the sections of the cultivator—i. e., by through-bolts i'. The rear ends of both the outer and inner beams, C C', of both cultivator-sections are thus secured or connected together by two plates which are common to all the said beams, and the said rear ends of the beams of the said sections are free to move or turn on the through-bolts, which thus serve as pivots thereto, in order to adjust the beams of the cultivator-sections when the sections are moved or extended toward and away from each other, as is necessary in marking or laying out the rows.

J designates a bracket, which is rigidly affixed to the lower plate, H', connecting the beams of the cultivator-sections, and this plate has depending lugs or flanges, in which are journaled the trunnions or shaft of a supporting roller or wheel, j, (shown in dotted lines in Fig. 2,) this supporting-roller being used when the device is adapted for marking out the rows, and it upholds the rear end of the frame, while the front end thereof is supported by two of the shovels.

K designates the extensible arms, which are pivoted at their outer ends to the extended ends of the straps at the front of the cultivator, and these arms are each provided with a series of perforations or apertures, k, through which are passed the bolts which connect the arms to a connecting-bar, K', which is also provided with a series of perforations, through which are passed the bolts or pins which connect the extensible arms K to the connecting-bar, the upper surface of the bar K' and the under surface of the connecting-arms K being protected by means of metallic plates $k^2$, which have the perforations or apertures, which coincide or register with the apertures of the said arms and bar, as shown.

It will be seen that when the cultivator-sections are adjusted laterally of each other, to adapt the shovels carried thereby to rows of different widths, the bolts that connect the arms and bar together are removed, the arms adjusted with the cultivator-sections in moving the latter, and the bolts then again passed through the arms and bar, and thus hold the sections of the cultivator at their proper required distance apart.

L designates uprights, which are secured at their lower ends to vertical ears l on the upper plate, H, of the cultivator, and the upper ends of these bars are connected by a handle-bar, L'.

M designates the handles of the cultivator, which are connected at their front ends to brackets m, that are rigidly affixed to the connecting-bar K. The rear ends of the handles are affixed or connected to the upper ends of the uprights L, and they are braced against sidewise movement by the connecting-bar L'.

N designates clevises, which are swiveled to the extremities of the connecting-bars K, and each of these clevises is provided with an eye or ring, to which the draft-animal is hitched in order to drag the implement along.

The operation of my invention will be readily understood from the foregoing description, taken in connection with the drawings.

My improved cultivator is very simple, strong, and durable in construction, thoroughly effective and reliable in operation, easily and quickly adjusted, and comparatively cheap of manufacture.

The cultivator can be easily adjusted to rows of different widths, and the shovels or blades are adjustable simultaneously with the movement of the cultivator-beams, in order to change the relative position of the blades or shovels to the beams and the line of draft of the implement, and the said shovels can be easily adjusted to enter the soil to different depths.

Slight changes in the form and proportion of parts can be made without departing from the spirit of my invention.

Having thus fully described my invention, what I claim as new, and desire to secure by Letters Patent, is—

1. In a cultivator, the combination of the laterally-adjustable connected sections, each consisting of the parallel beams, the links connected at their ends to the beams, the through-bolts, the shovel-standards pivoted at one end to one of the links, and the arms intermediate of the standard and the other end of the links, substantially as described.

2. In a cultivator, the combination of the laterally-adjustable sections, each having the parallel beams, the pivot-plates intermediate of the rear ends of the beams of the sections, the links connected at their ends to the beams, the shovel-standards connected at their upper ends to one end of the links and carrying the shovels at their lower ends, and the arms pivoted at their upper ends to the opposite ends of the links, and adjustably connected at their lower ends to the shovel-standards, substantially as described.

3. In a cultivator, the combination of the sections A B, adjustable laterally of each other, and each having the parallel connected beams carrying the shovel-standards, the connecting-arms pivoted to the forward ends of the sections and adjustably connected together at their inner ends, the connecting-plates pivoted to the rear ends of the beams of both sections, and a handle, substantially as described.

In testimony that I claim the foregoing as my own I have hereto affixed my signature in presence of two witnesses.

JAMES MACAULAY SUTTON.

Witnesses:
 JNO. R. THOMAS,
 J. N. COLE.